Feb. 1, 1927.
G. SMITH
1,616,007
MEANS FOR PREPARING PANS FOR BAKING
Original Filed April 17, 1925   6 Sheets-Sheet 4
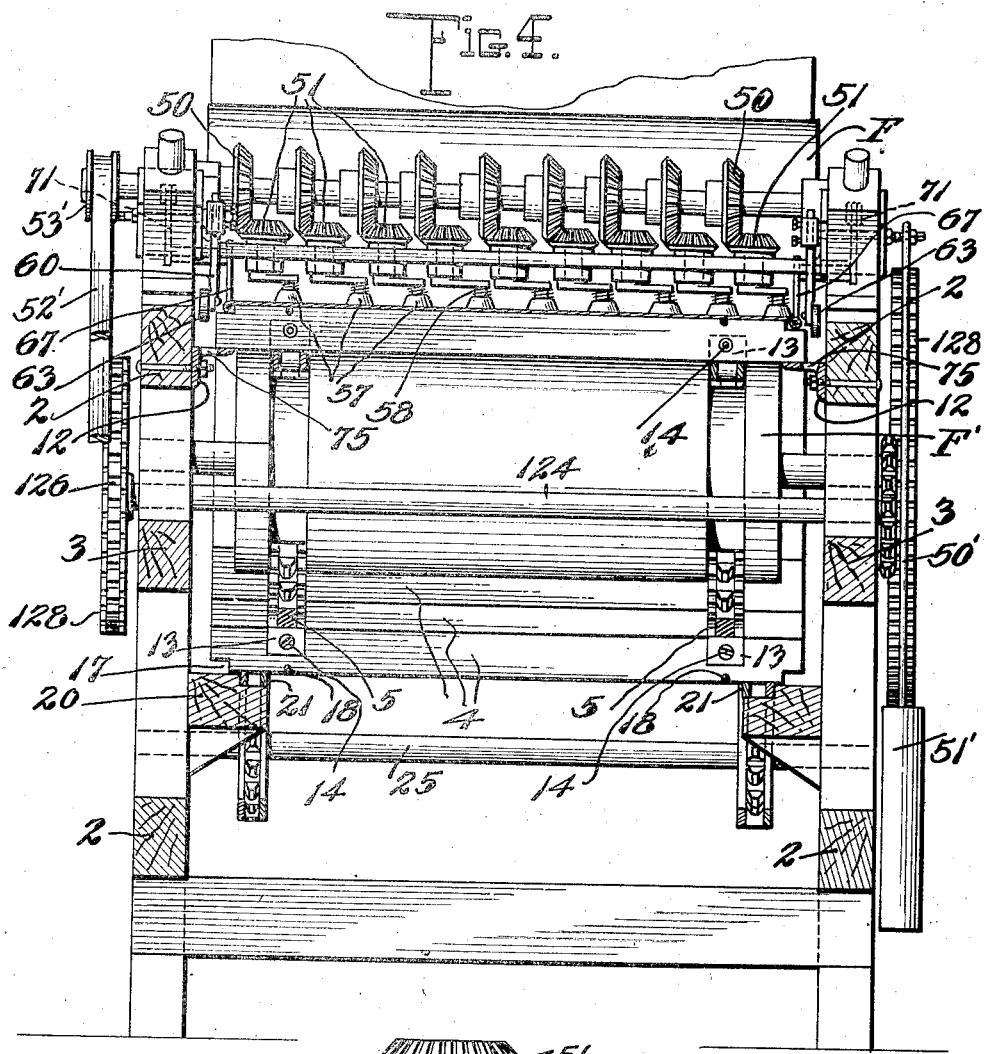
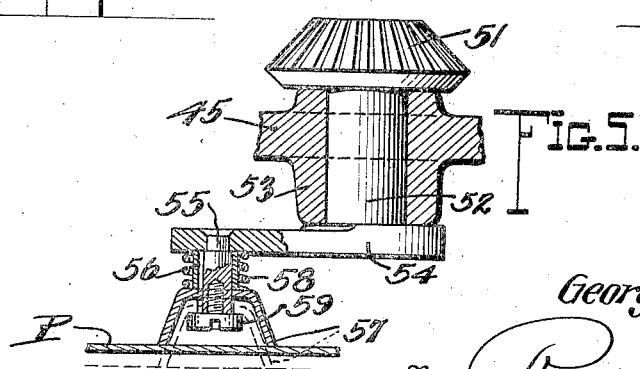
Inventor
George Smith
By Robb & Robbstill
Attorneys

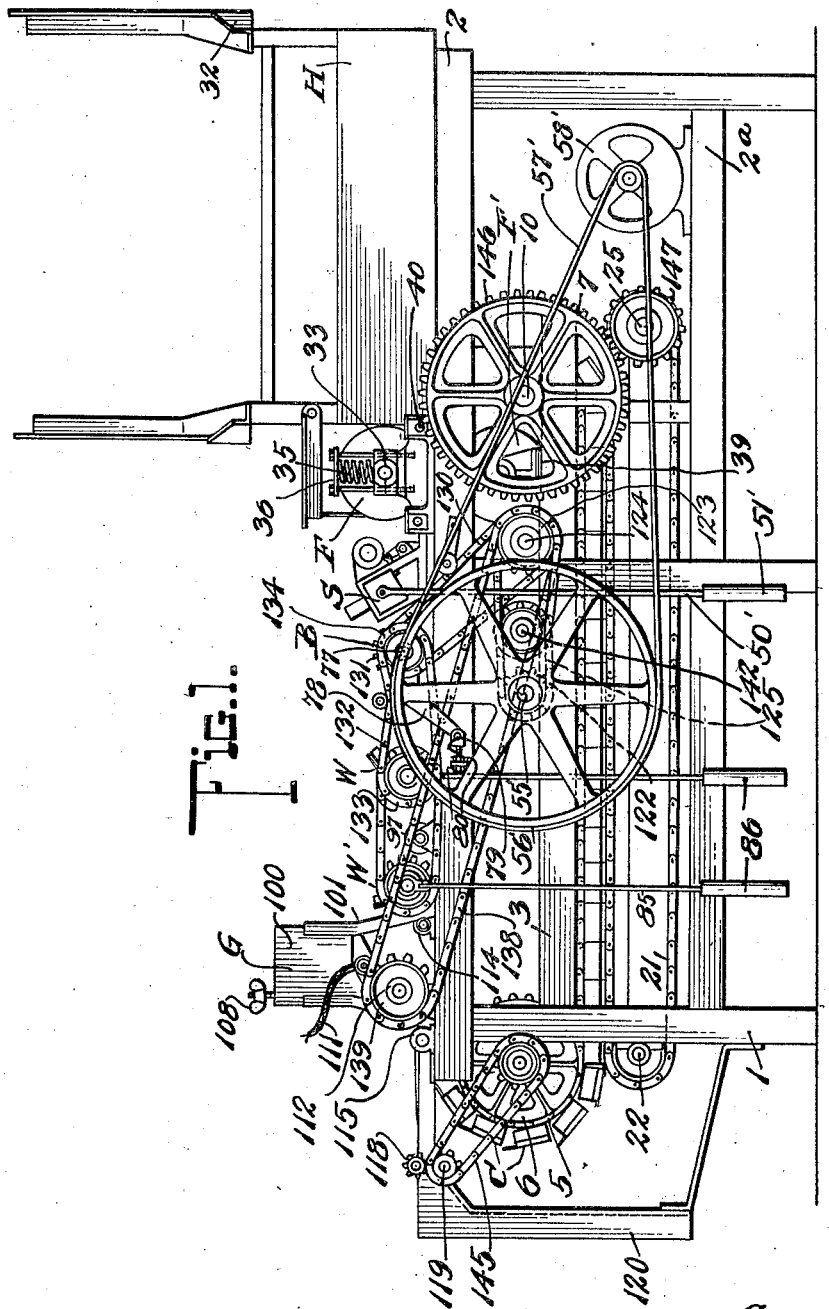

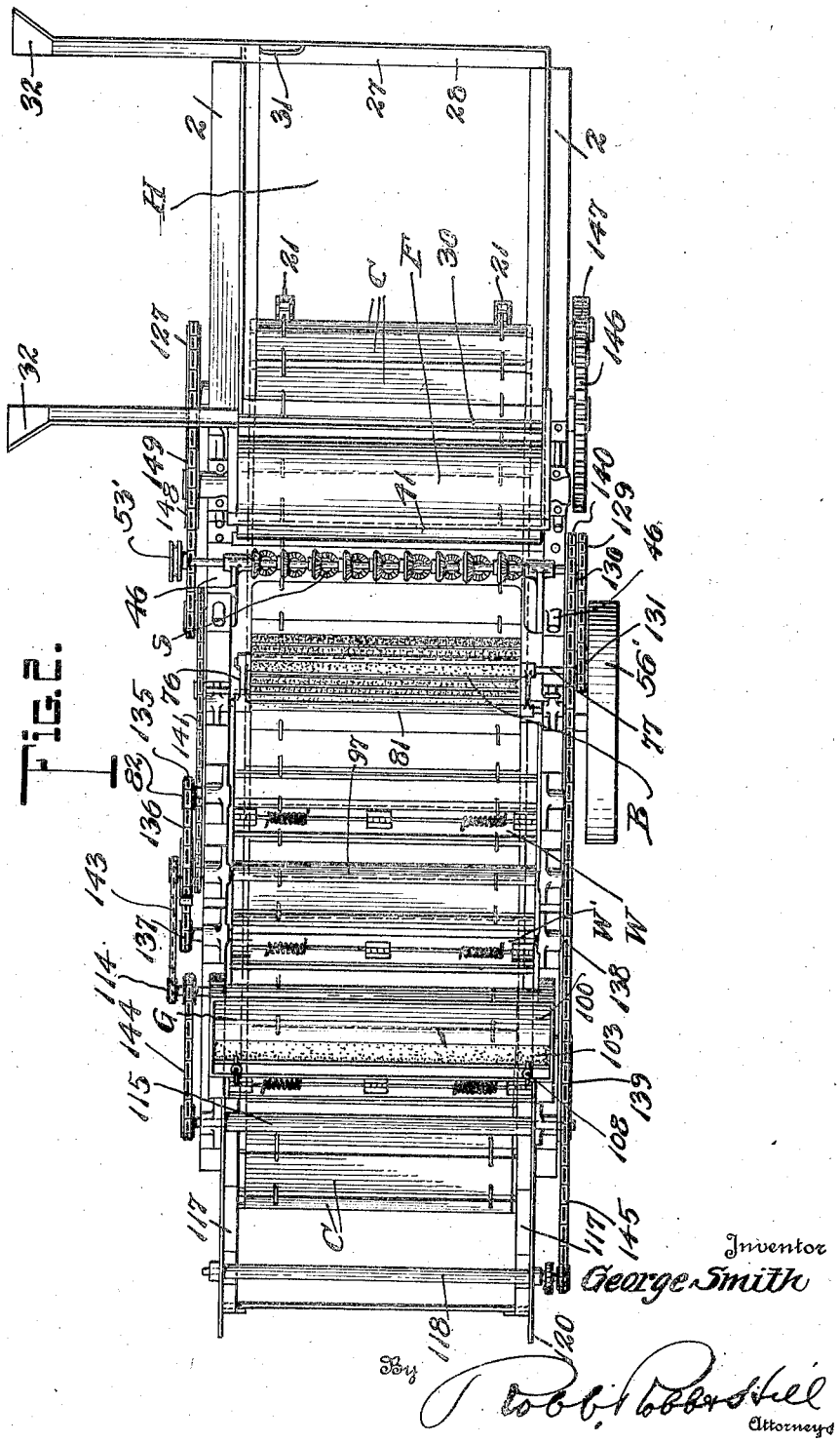

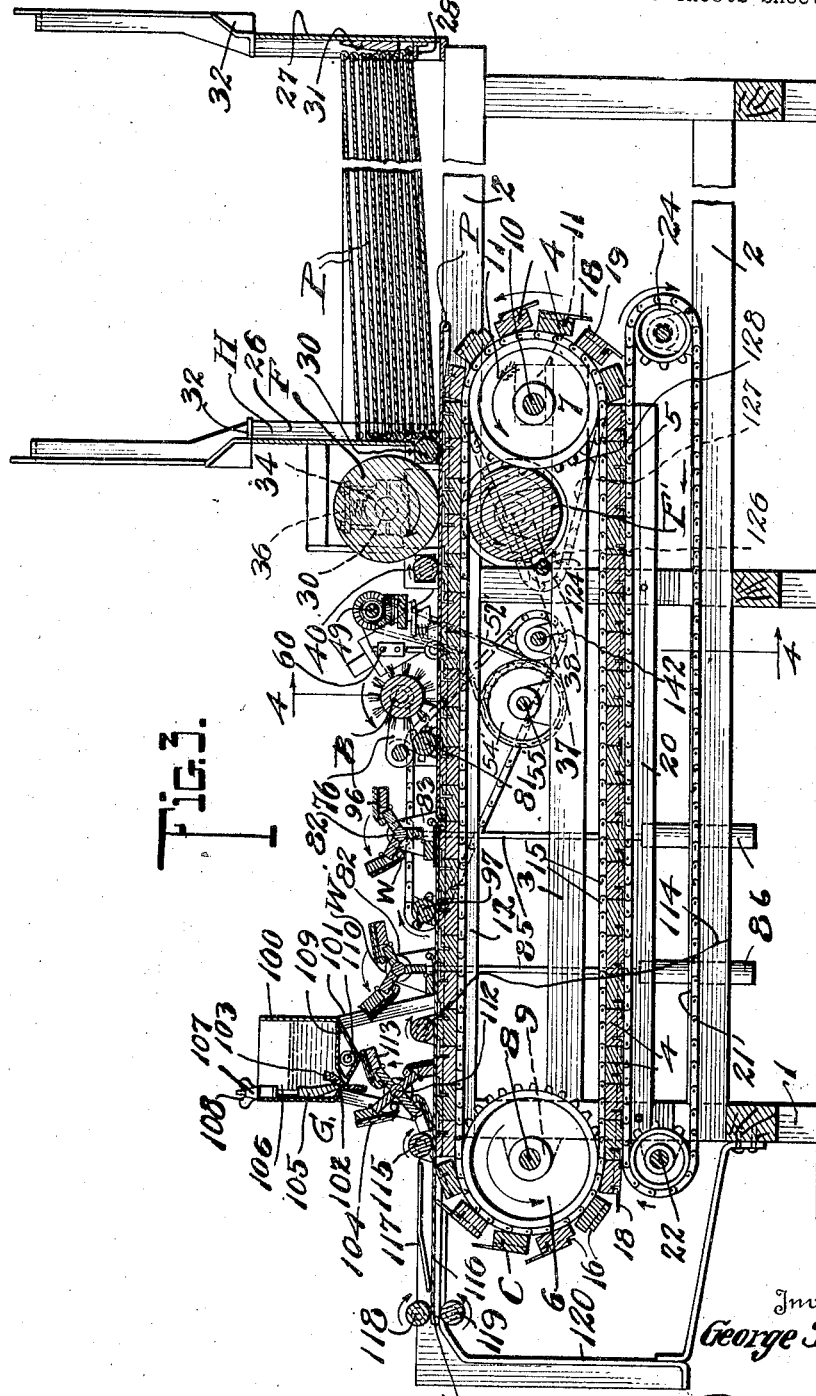

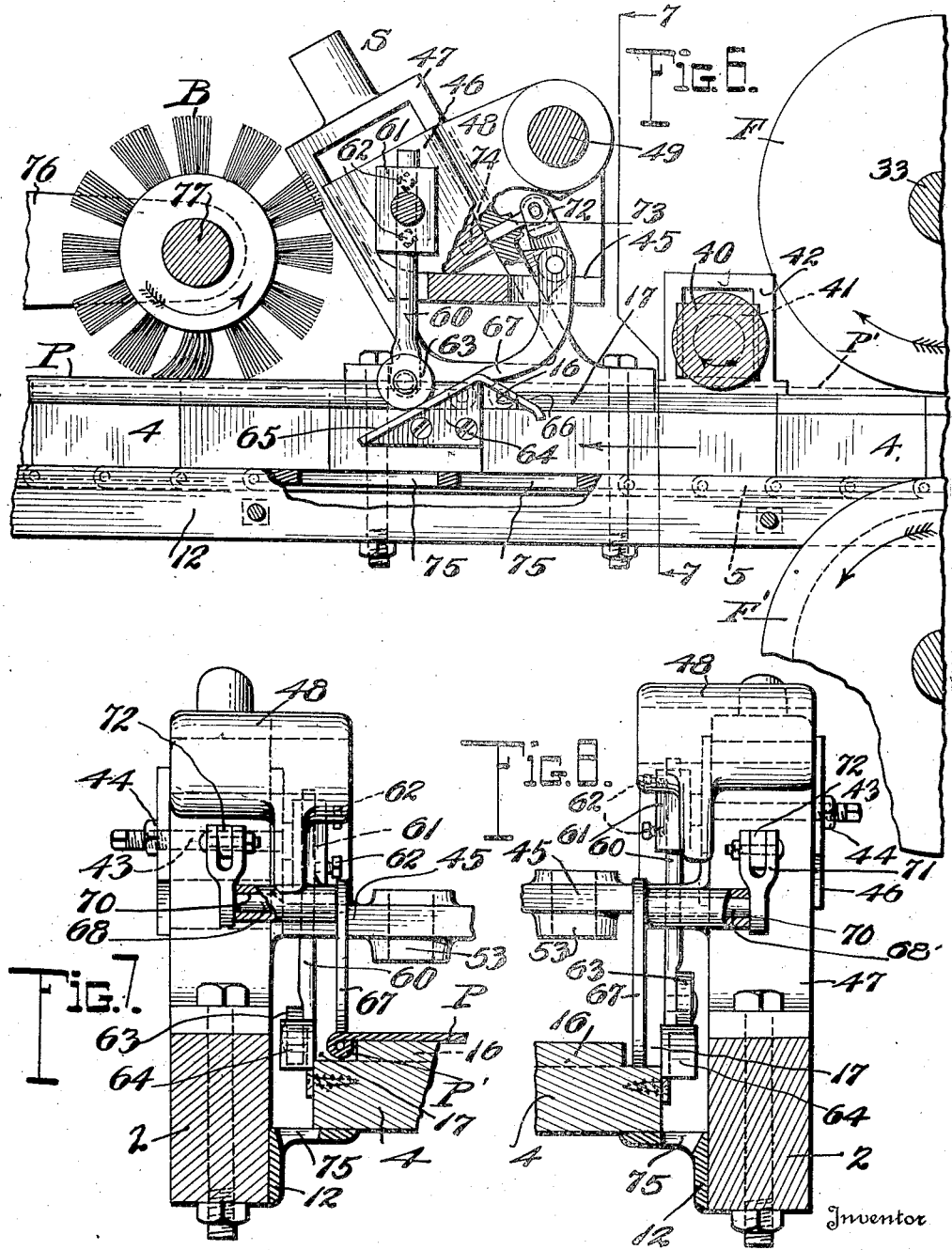

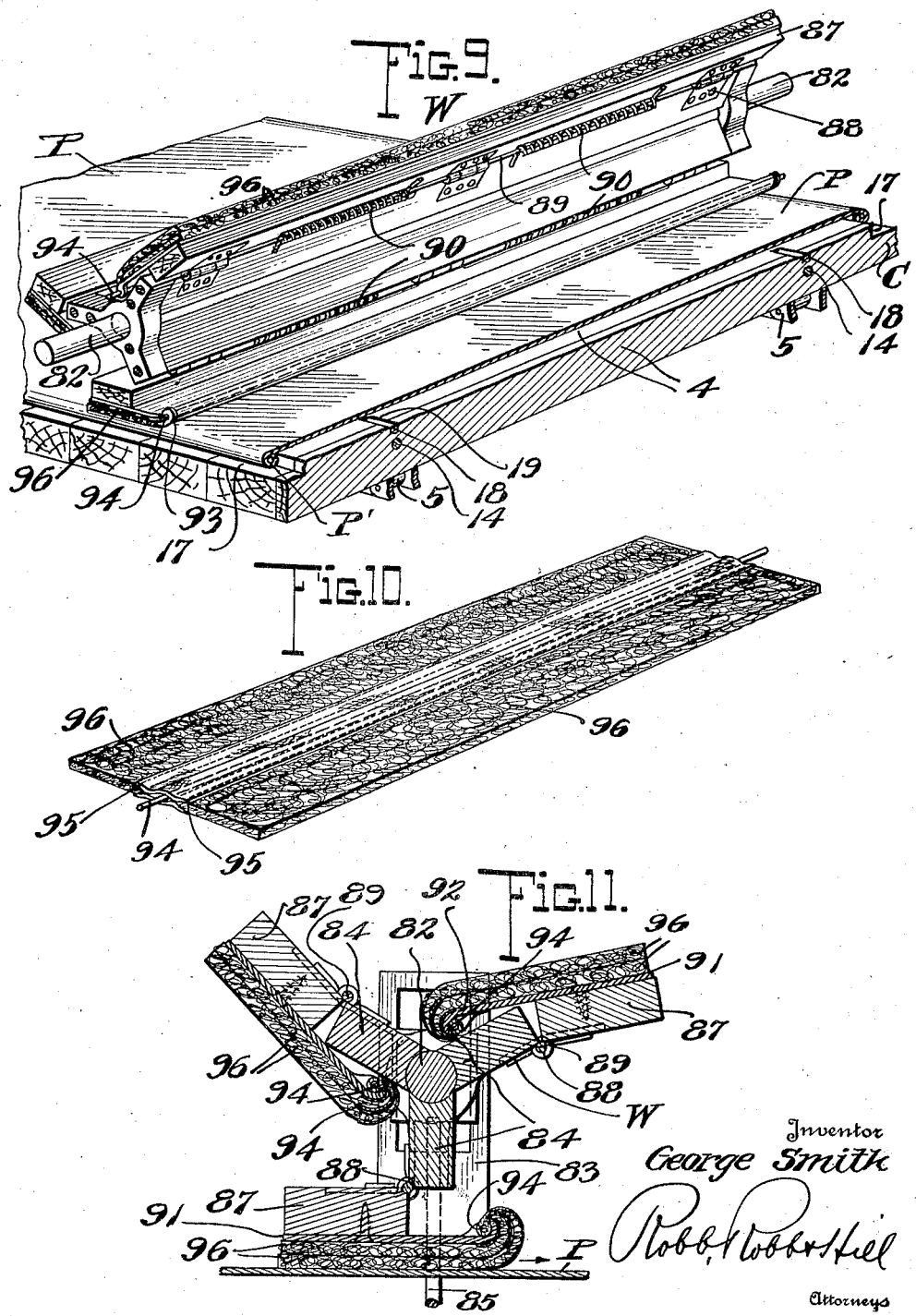

Patented Feb. 1, 1927.

1,616,007

UNITED STATES PATENT OFFICE.

GEORGE SMITH, OF RICHMOND, VIRGINIA.

MEANS FOR PREPARING PANS FOR BAKING.

Original application filed April 17, 1925, Serial No. 23,980. Divided and this application filed October 5, 1925. Serial No. 60,519.

This invention relates to improvements in mechanisms for preparing pans or "cracker sheets" preliminary to use in baking, as described in my co-pending application for pan preparing mechanism, Serial Number 23,980, filed April 17, 1925, of which this is a division.

Preparatory to the operation of baking it is necessary for the baking pans which consist of large flat metal sheets having their edges rolled down and reinforced to be thoroughly cleaned of the residue left from previous use and uniformly greased throughout its surface before placing thereupon the new batch of pastry. These operations usually are carried out by hand and are more or less unsatisfactory especially as regards the greasing because unless this is strictly uniform with just the right amount of grease, it results in either a sticking of the dough or an inferior product, when insufficient grease or to much is used, respectively.

It is the object of this invention to provide a unitary machine to which the pans are fed from a conveyor as the baked products are removed, and by a sequentially operative set of devices, perform the operations of flattening the pan, scraping, polishing and greasing it for its next use.

While, as stated this mechanism includes the means for flattening the pan, no claim is being made herein for this feature, as this constitutes the subject matter of my co-pending application before referred to.

Other and further objects and advantages of the invention will be hereinafter set forth and the novel features thereof defined by the appended claims.

In the drawings:—

Figure 1 is a side elevation of the machine;

Figure 2 is a general top plan;

Figure 3 is a central longitudinal section through the machine; certain gearing and other elements being removed for the sake of clearness;

Figure 4 is a cross sectional view taken on the line 4—4 of Figure 3;

Figure 5 is a detail section of one of the scrapers;

Figure 6 is an enlarged longitudinal section through the scraper control;

Figure 7 is a section on the line 7—7 of Fig. 6;

Figure 8 is a similar view with the parts in different position;

Figure 9 is a perspective of one polisher;

Figure 10 is a like view of the polishing cloth before application; and

Figure 11 is a vertical section through the polisher.

Referring specifically to the drawings, the frame of the machine includes legs 1, upper and lower longitudinal sills 2 and 2ª, respectively, there being also provided suitable cross members which with the sills are appropriately fastened to the legs. At each side of the machine throughout the major portion of its length intermediate sills 3 are furnished for the purpose of supporting certain of the driving mechanism for the various instrumentalities which the machine includes.

Pan conveyor.

Running longitudinally of the frame and between the upper sills 2 is a travelling bed or conveyor C which is adapted to engage and feed the pans P to be acted upon by various appliances for flattening, scraping, brushing, wiping or polishing, and greasing. These appliances are carried by the sills 2, excepting one of the elements of the pan flattening device which is supported by the sills 3. The conveyor C is formed of cross pieces or blocks 4 which may be of wood or other suitable material, and are connected to endless sprocket chains which are trained over gears 6 and 7, the gears 6 at the delivery end of the machine being undriven and the gear 7 at the receiving end being driven.

The gears 6 are keyed upon a shaft 8 which rotates freely in bearings 9 while the gears 7 are carried by a shaft 10 mounted in bearings 11 on the sills 3. The bearing 11 is disposed substantially beneath the delivery from the pan hopper H at the front of the machine. To support the upper reach of the conveyor and prevent sagging thereof, opposite angle irons 12 extend inwardly from the inner faces of the sills 2 throughout substantially the length of the conveyor reach.

A desirable form of the conveyor 5 consists of an attaching plate 13 extending from one of the links thereof and inset in the face of the conveyor block to which it is secured by a bolt 14 extending through the block intermediate of the plates 13. The conveyor link 15 lies substantially beneath the lateral center of the block so as to properly support the same in its travel about the sprockets and in its approach to a horizontal position for receiving the pan. This pan is of the usual type used in bakeries and the body thereof is provided with a reinforced bead P' at all of its edges, the pan being preferably of rectangular shape and adapted to lie with its body portion in direct contact with the upper surface of the conveyor blocks. In order to receive the beaded edge of the pan these blocks are formed with a longitudinal groove or rabbet 16 of sufficient depth to permit the pan to contact with the upper face of the block and a similar lateral recess 17 adjacent the ends of the blocks disposed to receive the pan P at that point upon a number of the blocks. The recesses 16 are spaced from each other relative to the diameter of the pan upon which the mechanism is operating.

In order to prevent the beaded edge of the pan from entering between two of the blocks as they travel from a curved to a straight path I have provided an overlapping element which may comprise a finger or plate 18 secured to one block and adapted to lie flush in a recess 19 upon the adjacent block as shown in Figure 3. From this view it will be seen that as the blocks approach a horizontal path these fingers pass into the recesses and effectually prevent the entrance of a pan flange between the blocks even if fed out of position.

It will be noticed that the longitudinal recesses 16 to receive the pan flanges are disposed so that the recess for the advancing edge of one pan is opposite a similar recess for the rear end of the other or preceding pan, so that the pans when upon the conveyor form a substantially continuous surface without any interval or space intermediate thereof.

In order to support the lower reach of the conveyor and also drive the same to relieve the links of the chain of the driving strain a plurality of carrier chains 21 have been provided and bear against the under face of the lower reach of the conveyor chain C. This carrier may be mounted upon sprockets on the shaft 22 at its rear end carried by brackets 23 while the forward end thereof is carried over a sprocket 24 upon a shaft 25 which is suitably driven at a speed slightly greater than the blocks of the conveyor C. The upper reach of the chains 21 travels upon a supporting sill 20 which maintains it in proper position throughout its length. This arrangement results in a pushing action upon the blocks of the conveyor causing them to be fed forward in their passage through the lower reach and also pushed forward by the drive for the conveyor C at the upper reach, which effects a close contact between the blocks and prevents excessive wear upon the links of the sprocket chain or breaking thereof under the driving tension.

Pan hopper.

The pan hopper H is positioned at the front end of the frame upon the sills 2 and comprises essentially a front wall 26 and a rear wall 27, the latter being provided at its lower portion with a supporting bracket 28 disposed above the bottom of the hopper so as to maintain one end of the pans P therein in a position inclined to the bottom of the hopper. The front wall 26 is provided at its lower portion with an opening 29 which is substantially closed by a roller 30 which extends slightly into the hopper and is so positioned that when the flange of the lowermost pan enters the recess upon the conveyor it will pass beneath this roller and be forced into a seated position when the movement of the conveyor will withdraw the opposite end of the pan from the supporting bracket 28 allowing the pan to fall into intimate contact with the upper face of the conveyor. The rear wall 27 is further provided with an inclined face 31 which forces the uppermost of the series of pans toward the front wall of the hopper above the roll 30 and thus relieves to some extent the pan to be delivered of the weight of the superposed pans.

When the lowermost pan is withdrawn it will be seen that the next pan will fall into position upon the bracket and its lower edge travels upon the surface of the pan connected to the conveyor until it reaches the rear thereof when the bead of the succeeding pan will fall into the next receiving groove of the conveyor. The pan hopper is provided at one side with slide ways 32 extended therefrom and into which the pans may be introduced for proper positioning in the hopper. As they fall from these slides one end strikes the inclined block 31 at the rear of the hopper, which forces forward the front edge of the pan into contact with the wall 26 by which it is supported during the delivery of the lower pans.

Flattening means.

As the pan passes from the hopper beneath the retaining roll 30 it is held in firm contact with the upper face of the conveyor and drawn beneath the flattening roll F which is of considerable weight and has a yielding tension. This is effected by disposing the shaft 33 of the roll in an adjustable boxing 34 upon which the tension spring 35 acts downwardly as it is disposed beneath a fixed head plate 36. Beneath the conveyor and contacting with the under face thereof is a companion flattening roll F' the journal 37 of which is disposed in a bearing 38 which may be adjusted to compensate for wear and to properly position the roll by means of insertible shims or plates 39 disposed beneath the bearing box. In normal condition of use the supporting roll F' is disposed slightly above the horizontal plane of the conveyor travel so that its cooperative effect with the upper roll is to remove any buckle or distortion of the pan which is thereby flattened into a substantially true plane.

The upper roll F is suitably driven while the lower roll runs loosely and is rotated slowly by frictional engagement with the under face of the conveyor. This driving of the upper roll not only tends to straighten or flatten the pan in its passage beneath the same but also performs to a certain extent a forward feeding action. In order to maintain the opposite ends of the pan in contact with the conveyor a retaining roll 40 is disposed at the opposite side of the flattening roll F from the retaining roll 30, these tending to hold the ends of the pan downward while pressure is applied intermediate thereof.

The tension rolls 30 and 40 are mounted for limited vertical sliding movement so that the pans may readily pass beneath them, and for this purpose their shafts are pivoted in sliding bearing boxes 41 retained within keepers 42 as shown by dotted lines in Figure 6. The mounting of the flattening rolls in contact with opposite faces of the conveyor permits any adjustment of the lower roll to be transmitted to the upper flattening roll so as to apply the pressure to the pan in such position as to counteract the distorted surface thereof.

*Scraper mechanism.*

The pans after passing beneath the flattening rolls are brought into contact with the scraper mechanism indicated at S, which effectually removes any flour, sugar or other adhering material therefrom by a rotary scraping action applied to the upper surface of the pan. A desirable arrangement of this mechanism is specifically shown in Figures 5, 6, 7 and 8 wherein a cross bar 45 is provided at opposite ends with offset slide blocks 46 which are mounted within guides 47 secured to the upper face of the sill 2. These guides rise in a rearward inclined direction from the sills and such disposition is particularly effective in the raising movement of the cross bar, as hereinafter described.

At opposite ends of the cross bar bearing brackets 48 carried by and rigid with the bar 45 and blocks 46 are provided and support a driving shaft 49 which carries a plurality of spaced bevel gears 50 secured thereon in position to mesh with a cooperating gear 51 upon a stub shaft 52 pivotally mounted in a bearing 53 dependent from the cross bar 45. This stub shaft is provided at its lower end with a crank arm 54 to the outer end of which a pin 55 is secured and extends downward. Slidingly mounted upon this pin and keyed thereto is a collar 56 at the upper portion of a bell shaped or annular scraper 57. This mounting provides for a vertical sliding movement of the scraper to adjust itself to inequalities in the surface of the pan and the scraper is normally tensioned downward by a spring 58 and limited in such movement by a head 59 upon the pin 55, as shown in detail in Figure 5. This mounting provides for a rotary movement of the scraper concentric to the axis of the driving gear so that in the use of a plurality of scrapers the operative field of action of one overlaps that of the other and thus secures a complete cleansing of the surface of the pan.

In order to maintain the scrapers under the proper tension in contact with the pan the slide block 46 at one side of the machine is suitably weighted by means of a depending rod 50' pivoted thereto and carrying a weight 51' (Fig. 1) while the opposite slide block (Fig. 4) is tensioned by means of the driving belt 52' passing over the pulley 53' thereon and extending to the drive pulley 54' upon the shaft 55' which carries at the opposite side of the machine the fly wheel 56' suitably connected, for instance by a belt 57', with a motor 58' or other source of power. A suitable form of belt tightener, not shown, may be provided for belt 52' to permit proper shifting of the drive shaft 49 with the cross bar 45.

When the belt is in the position shown in Figure 3 the scrapers are constantly moved in one direction and the result thereof is to dull or wear down the annular portion upon the advancing side of the scraper. In order to compensate for such wear and resharpen the worn edge the direction of travel of the scrapers may be reversed by crossing the belt 52' in the usual manner which causes the driving gears 50 upon the cross shaft to revolve in an opposite direction. By this means the life of the scrapers may be materially prolonged and the cutting edges thereof maintained in the best possible condition for effective work.

In order to prevent injury to the scrapers or to the pans in passing from one pan to another during the continued travel of the pans beneath the rotating scrapers, provision is made for lifting the scrapers out of contact of one pan and bringing them into contact with the succeeding pan at the abutting edges of the pans. This is accomplished by means of a trip rod 60 mounted upon the slide block 46 by passing through a casing 61 thereon to which it is adjustably secured by means of the set screws 62. This rod may be also adjusted rotatably or at an angle to the box by means of the bolt 43 extending therethrough and secured in position by the clamp nut 44, as shown by dotted lines in Figure 7.

The lower end of the rod 60 is provided with a friction roller 63 which travels in a path beyond the side edges of the conveyor and pans. Cooperating with this roller is a cam or trip plate 64 suitably secured to the outer edge of the conveyor blocks adjacent to the position of the abutting recesses 16 therein, as shown in Figure 6. This trip plate extends over the line of juncture of the blocks of the conveyor with its apex at that line. The plate comprises an upwardly inclined surface 65 and a downwardly inclined face 66 so that as the roller engages the former the slide block and the scraper mechanism carried thereby is lifted from the pan and maintained in elevated position until after the roller passes onto the face 66 when the scrapers again descend into contact with the pan. By a proper adjustment of the trip rod the degree of such elevation may be regulated as found desirable.

This elevation of the scraper mechanism is materially assisted by the rearward inclination of the slide blocks as the advancing travel of the pan exerts a pushing pressure against the scrapers which is translated by the cross bar to the slide blocks and prevents the resistance to change to an upward movement which would occur if the bar moved at a right angle to the travel of the pan.

Under ordinary conditions of feeding the pans succeed one another in a continuous series, but if for any reason the feed of a pan should be missed or omitted the scrapers would come into direct contact with the surface of the wooden conveyor bars which would result in injury thereto as well as to the scrapers. In order to provide against such contingency means are mounted upon the frame 47 of the slide block by which said block may be latched in an elevated position thus holding the scrapers clear of the conveyors during the period when no pan is present. This is accomplished by means of a contact arm 67 which travels in a path directly above the recess or rabbet 17 at the side edges of the conveyor members. This arm is rigidly secured to a crank member 68 pivotally mounted within a bearing 70 at one side of the frame and carrying in its upper portion a bifurcated arm 71 to which a latch member 72 is pivotally connected and extends through an aperture 73 in the frame 47 so as to enter a recess 74 in the slide block 46. When the conveyor is provided with the pan in the usual manner this arm rides upon the side edge thereof as shown in Figure 7, while if the pan be absent the arm gravitates into the recessed portion 17, thus throwing the latch bolt 72 inward into contact with the slide block 46 which has been previously elevated by the trip rod 60, as before described, such position of parts being shown in Figure 8.

The action of the scrapers tends to throw the material removed toward the sides of the conveyor and for the purpose of facilitating the discharge thereof the angle supporting irons 12 are formed with slotted portions 75 through which the material may pass to a suitable receptacle.

Brush mechanism.

After the scraping action the pans pass to the brush device B and carry upon their surface loose particles which are removed by this brush. The brush in the form shown is supported upon a pivoted arm 76 by means of a driving shaft 77 which is suitably rotated in a direction opposed to the advance of the pans, which mechanism will be hereinafter described. The tension of the contact of the brush with the pan is adapted to be regulated by pivoting the arm 76 at 77 and providing a crank arm 78 which is pivotally connected at its lower end with an adjustable screw member 79 supported upon the upper sill 2, as shown in Figure 1. It will be apparent that by an adjustment of the opposite nuts 80 of this bolt 79 the brush may be moved relatively to the pan to be cleaned.

At the rear of the brush unit B a driven holding roll 81 is disposed which tends to retain the pans in position upon the conveyor and assists in feeding the same.

Wiping mechanism.

The pans having been cleaned by the brushing element are next subjected to the successive action of a plurality of wiping and polishing elements W—W', the former being adapted to thoroughly wipe the surface and the latter to polish the same. These elements are substantially identical in construction and the detail structure of only one will be described, the other being correspondingly indicated. The wiping element W comprises essentially a shaft 82 mounted in bearing brackets 83 upon the upper sill 2 and carrying a frame having radiating arms 84. The number of these arms or wings may be varied at will, three being herein shown in Figure 3. The shaft and wings are driven in a direction opposite the travel of the conveyor C and the shaft is supported for limited vertical movement in the bearings 83 and tensioned toward the pan or conveyor by means of depending rods 85 carrying weights 86 at opposite ends of the shaft 82. Secured to the wings are leaf extensions 87 by means of pivotal joints 88 through which a longitudinally extending rod 89 extends. Coiled about this rod is a spring member 90 bearing at its opposite ends upon the wing and extension 87 so as to normally force these parts toward the same plane. Each of the extensions 87 has secured thereto a longitudinally extending plate 91, one edge 92 of which is curved inwardly and overlaps the supporting wing 84 to which the extension is pivoted. This inwardly curved longitudinal edge of the plate 91 is provided at each end with ears 93 for removably supporting a rod 94 which is passed through a fabric binding 95 carrying at its opposite edges the wiping strips 96 of relatively stout material which are coextensive with the plates 91.

As shown in Figure 11, when the shaft 82 is rotated the extensions are bent rearwardly by contact with the pans P and the wiping plies 96 being brought into superposed relation against the surface of the pan.

It will be obvious that by removing the rod 94 and reversing the position of the ends of the binding strip a clean ply may be brought from its previous superposed position in the wiping operation and will come to bear down upon the pan surface. The plies can obviously be shifted so that each one of its two sections will be brought into direct contact with the pans which effects a material economy inasmuch as the four surfaces of one wiping unit can be used at different periods of cleaning. As the rotation of the wiper shaft is counter to the direction of movement of the pans and bead, it is desirable to provide a holding roller 97 intermediate the first and second wipers in order to maintain the pan in proper position. This roller is driven in the direction of movement of the conveyor and serves to accelerate such movement, being in structure substantially similar to the roller 81 before described. The second wiping element W' is similar to the first and is maintained under yielding tension by the weighted rods at its opposite ends, as before described.

Grease applicator.

The pans having been thoroughly flattened, scraped, brushed, wiped and, lastly, polished by the second of the wiping appliances, they are now ready to receive the thin coating of grease, after which they will be passed to the machine for depositing the dough for a new batch of cakes.

The grease for application to the pans is stored in a receptacle 100 which is mounted upon brackets 101, as shown in Figure 3. This receptacle extends transversely across the frame and has a trough-like portion 102 at its bottom provided with a slot co-extensive with its length and through which a wick 103 extends, the function of which is to supply grease to a rotary applicator 104. The flow of grease through the wick is controlled by means of a strip 105 which is adapted to bear against the wick to compress the same against a wall of the trough slot 102. The strip is controlled by means of screw rods 106 which pass through top bearings 107 and are provided at their upper ends with finger grips 108. By tightening the strip firmly against the wick the flow of grease may be entirely cut off, while a variation of such pressure determines the amount of feed to the greasing element G.

Beneath the bottom of the receptacle 100 a chamber 109 is provided which is accessible from one end and adapted to receive any desired heating means such as an electric coil 110 to which current may be supplied by a suitable conductor 111 indicated in Figure 1. The function of the heater is to maintain a proper temperature of the grease in the receptacle so that its liquid condition will cause it to freely feed through the wick. It is also desirable that the side and bottom walls of the chamber 110 be suitably insulated so that the heat generated will be directed against the bottom of the receptacle.

The grease applicator 104 is generally similar in construction to the wiping elements before described and comprises essentially a shaft 112 which is driven in a direction counter to the travel of the pans and the wings of which carry the fabric contact members 113, these being adapted to engage the depending end of the wick during their rotation. The number of such wings may be varied, four being herein shown as found sufficient to properly apply the grease to the pans.

At opposite sides of the greasing element G, additional holding rolls 114 and 115 are disposed and driven in the same direction as the travel of the pan which act to hold the pan in the rabbeted portion of the conveyor during its continued movement. The pans pass from the greasing element upon a delivery extension 116, being held thereon if desirable by a guide element 117 until the free edge of the pan is engaged by the delivery rolls 118 and 119 respectively, which are driven in the direction of travel of the pan and at a greater speed, thus causing a forcible withdrawal of the pan from the conveyor and its delivery into a suitable hopper such as indicated at 120. By this construction any possible jamming of the pans at the outlet of the machine is effectually avoided and a tension maintained on the pans during their passage through the final greasing element of the mechanism.

Driving mechanism.

The motor 58' is mounted on longitudinal sills 2ª and drives a pulley wheel 56' on the main drive shaft 55 of the machine by means of a belt 57'. The main drive shaft is journaled in bearings supported upon the sills 3 of the frame. The end of the main drive shaft opposite the pulley 56' is provided with a small pulley 54' having a grooved periphery for receiving a belt 52' which is trained around a grooved pulley 53' which is keyed to the end of the scraper drive shaft 49. A suitable spring controlled belt tightener (not shown) holds the drive belt 52' taut whether the scraper support 46 is at its upper or its lower position in the guides 47.

The conveyor C is driven in the direction of the rear of the frame of the machine from the main drive shaft 55' which has a sprocket gear 122 just inside of the pulley 56' (Fig. 1). This sprocket gear drives a sprocket 123, which is keyed onto shaft 124, by means of chains 125. The shaft 124 runs transversely of the frame and parallel with the main drive shaft 55', and carries at the other side of the frame from the main drive a small sprocket gear 126 which through a chain 127 drives a large sprocket gear 128 on the end of the shaft 10. The conveyor is thus moved in the direction of the arrow in Figure 3 to carry the pans P in the direction of the rear end of the frame. The upper flattening roll F is driven by a sprocket 148 on one end thereof and chain 149 extending to a sprocket on shaft 142 (see Fig. 3).

Rotation of the brush element B counter to the direction of movement of the conveyor C is attained by means of a gear 129 on shaft 124 which gear is adjacent to the sprocket 123 and drives by means of a chain 130 a sprocket gear 131 which is on the end of the brush shaft 77 (Fig. 2).

The first of the wiping appliances has its shaft 82 driven in the same direction as the brush shaft by means of a chain 132 which is trained around sprocket gears 133 and 134 which are keyed, respectively, upon the shafts 82 and 77. The gear 134 is just inside of the brush drive sprocket. The second wiping appliance is driven by a sprocket gear 135 on the opposite end of the wiper shaft 82, a chain 136 being trained over the same and over a gear 137 on the shaft of the second wiper. As will be evident from examination of the drawings, the brush shaft along with the shafts of the wipers are all moved in a direction counter to the movement of the conveyor C.

The grease appplicator is likewise driven counter to the movement of the conveyor C, as previously stated. The rotation is transmitted to the shaft 112 of the grease applicator by means of a chain 138 which is trained over a sprocket gear 139 keyed to the applicator shaft, the same receiving its motion from a sprocket gear 140 upon shaft 124. It is proper to observe that each of the driven elements thus far described are rotated in a counter-clockwise direction (as viewed in Figure 1).

The drive for the holding rolls 81 and 97 is through a sprocket chain 141 engaging sprockets thereon and extending to a sprocket on shaft 142. The holding rolls 114 and 115 are driven by a chain and sprocket connection 143 from shaft 97 to roll 114 and a similar connection 144 from roll 114 to roll 115. The delivery rolls 118 and 119 are geared together and driven at an accelerated speed by the chain and sprocket connection 145 from the shaft of the gear 6 to one of the rolls (Fig. 1). By taking power from the conveyor the roll speed is regulated relative to the movement of the pan. The lower conveyor chains 21 are moved at a greater speed than the conveyor C through the large gear 146 on one end of shaft 10 meshing with a smaller gear 147 on the driving shaft 25 for the chains 21.

*Operation.*

The detail operation of the several units of the invention has been described in connection with their construction. In the general operation of the mechanism the lowermost pan is drawn from the hopper by the conveyor and flattened beneath the cooperating rolls for that purpose, then fed beneath the scraping units by which adhering material is removed and this material brushed from the pan in its progressive movement through the machine. The pans are then fed beneath one of the wiping units which removes any material therefrom which may have passed the brush and is subsequently acted upon by the second wiper which functions also to polish the thoroughly cleaned surface of the pan. The pan is then passed beneath the greasing unit and the entire surface thereof evenly greased so that when delivered it is in condition for immediate subsequent use.

These several operations are successively and automatically performed in the progressive feed of the pans from the hopper to the delivery point. The system of driving mechanism provided assures a proper actuation of the several units at a speed to most effectually accomplish their several functions while the drive for the conveyor is of a special type adapted to relieve the chains of the tension or strain incident to their engagement with the pans and movement thereof beneath the operating members.

The pan feeding construction is especially designed to prevent the clogging of the hopper and to properly present the flange at one edge of the pan to the receiving recess upon the conveyor so that the latter may act to withdraw the lowermost pan and permit the next superposed pan to fall into proper position upon the pan being withdrawn to effect an accurate and continuous feed of the pans in alignment with the receiving grooves on the conveyor.

The construction of the flattening rolls permits the upper driven roll to effectually act upon a buckled or bent pan which is firmly supported in contact therewith by the lower roll while the scraping unit provides means for effectually acting upon the entire surface area of the pan through the rotary movement of the annular scrapers.

The invention also presents an important improvement in the feeding mechanism from the grease reservoir which prevents an excess of grease being aplied to the pan and controls the feed through the wick to determine the proper amount to prevent a deleterious action upon the cakes subsequently baked which would occur were too little or an excess of grease applied.

Another feature of essential novelty is the structure of the wiping members which is also embodied broadly in the greasing unit, this comprising the pivoted leaves carried by the wings which causes the fabric wipers to rest in parallel contact with the pan for an extended period during the rotation of the wiper and further permits the removal and reversal of the wipers so as to materially extend their period of usefulness.

Having thus described my invention, what I claim as new is:—

1. In pan preparing mechanism of the class described, a conveyer for pans, cleaning means arranged to move into and out of contact with the pans and to operate upon the surface of said pans to clean the same as the latter pass beneath the same, and means to automatically displace the last mentioned means from such contacting relation at the interval between successive pans.

2. In pan preparing mechanism of the class described, a conveyer for pans, means arranged in coacting relation to the conveyer to contact with the surface of the pans as the latter pass beneath the same, and means actuated by the conveyer in timed relation to the movement of the pans to automatically displace the last mentioned means at the interval between the successive pans.

3. In mechanism of the class described, a conveyer adapted to support a baking pan, a scraper operatively mounted to move toward and away from the surface of said pan, and means upon the conveyer intermediate the ends of adjacent pans adapted to coact with the scraper for raising said scraper away from the surface.

4. In mechanism of the class described, a conveyor adapted to suport a baking pan, a scraper operatively mounted to move toward and away from the conveyor and normally contacting with the surface of the pan to perform its scraping function, and means to raise and lock the scraper out of contacting position when the conveyor moves beneath the latter without a pan thereupon.

5. In a device of the class described, a conveyor for pans, a displaceable scraper arranged in coacting relation with the conveyor to contact with the surface of the pans as the latter pass beneath the same, and lifting means for the scraper actuated by the conveyor in timed relation to the movement of the pans to automatically displace the scraper at the interval between the successive pans.

6. In a device of the class described, the combination of a pan conveyer, a rotatable pan scraper disposed to revolve in a plane parallel to and in contact with the pan on said conveyer and comprising an annular body, and driving means to effect a rotative movement of said annular body in a path concentric to the axis of said driving means.

7. In a device of the class described, a pan conveyer, means thereon for engaging and retaining a pan in contact therewith, scraper mechanism including an adjustable supporting block movable to shift the scraper toward and from a pan, driving means, a scraper actuated by said driving means, a member dependent from said block and disposed in cooperative relation to the conveyer, and means upon the conveyer for engaging said dependent means to raise the block and scraper.

8. In a device of the class described, a pan conveyor, means thereon for engaging and retaining a pan in contact therewith, a scraper mechanism for the upper surface of said pan comprising an adjustable block, driving means carried thereby, a scraper also carried thereby and actuated by said driving means, a member depending from said block, means upon the conveyor for engaging said depending means to raise the block and scraper, and means cooperating with said block and conveyor for automatically latching the same in raised position in the absence of a pan beneath the scraper.

9. In a device of the class described, a conveyor provided with means for supporting a pan, a scraper mechanism disposed to operate upon said pan and comprising an adjustable block, a driving shaft carried thereby and provided with beveled gears, a cross bar also carried by the block, a series of scrapers having vertical bearings in the cross bar and cooperating gears, a crank upon the shaft of each scraper, and a scraping device disposed at the free end of said crank.

10 In a device of the class described, a conveyor provided with means for supporting a pan, a scraper mechanism disposed to operate upon said pan and comprising an adjustable block, a driving shaft carried thereby and provided with beveled gears, a cross bar also carried by the block, a series of scrapers having vertical bearings in the cross bar and cooperating gears, a crank upon the shaft of each scraper, and a scraping device disposed at the free end of said crank and comprising a cup-like body having a relatively thin cutting edge.

11. In a device of the class described, a conveyor provided with means for supporting a pan, a scraper mechanism disposed to operate upon said pan and comprising an adjustable block, a driving shaft carried thereby and provided with beveled gears, a cross bar also carried by the block, a series of scrapers having vertical bearings in the cross bar and cooperating gears, a crank upon the shaft of each scraper, a scraping device disposed at the free end of said crank, and means for tensioning said scraping device toward a pan.

12. In a mechanism of the class described, a conveyor adapted to retain a pan in contact therewith, a scraping mechanism mounted to act upon the upper face of said pan and mounted for movement toward and from the pan, a slide block carrying said scraping mechanism, a trip arm dependent from said block, and a cam disposed upon the conveyor to actuate said trip arm.

13. In a mechanism of the class described, a conveyor adapted to retain a pan in contact therewith, a scraping mechanism mounted to act upon the upper face of said pan and mounted for movement toward and from the pan, a slide block carrying said scraping mechanism, a trip arm dependent from said block, and a V-shaped cam disposed upon the conveyor adjacent the pan retaining means thereon adapted to actuate said trip arm.

14. In a mechanism of the class described, a conveyor adapted to retain a pan in contact therewith, a scraping mechanism mounted to act upon the upper face of said pan and mounted for movement toward and from the pan, a slide block carrying said scraping mechanism, a trip arm dependent from said block, a V-shaped cam disposed upon the conveyor adjacent the pan retaining means thereon adapted to actuate said trip arm, and means for adjusting said arm upon the block relative to said cam.

15. In a device of the class described, a conveyor having means for retaining a pan thereon, a scraping mechanism mounted to operate upon the pan and comprising a slide block, means upon the conveyor for elevating said block, a latch for retaining said block in elevated position, and a contact finger controlling said latch and adapted to normally ride upon the pan to retain the latch in inoperative position.

16. In a device of the class described, a conveyor having means for retaining a pan thereon, a scraping mechanism mounted to operate upon the pan and comprising a slide block, means upon the conveyor for elevating said block, a latch for retaining said block in elevated position, a contact finger controlling said latch and adapted to normally ride upon the pan to retain the latch in inoperative position, and means upon the conveyor to permit said contact finger to gravitate in the absence of a pan upon the conveyor and shift the latch into operative position.

In testimony whereof I affix my signature.

GEORGE SMITH.